Sept. 27, 1966 T. R. STOCKTON 3,275,010
CENTRIFUGAL MASS TYPE GOVERNOR
Filed May 23, 1963
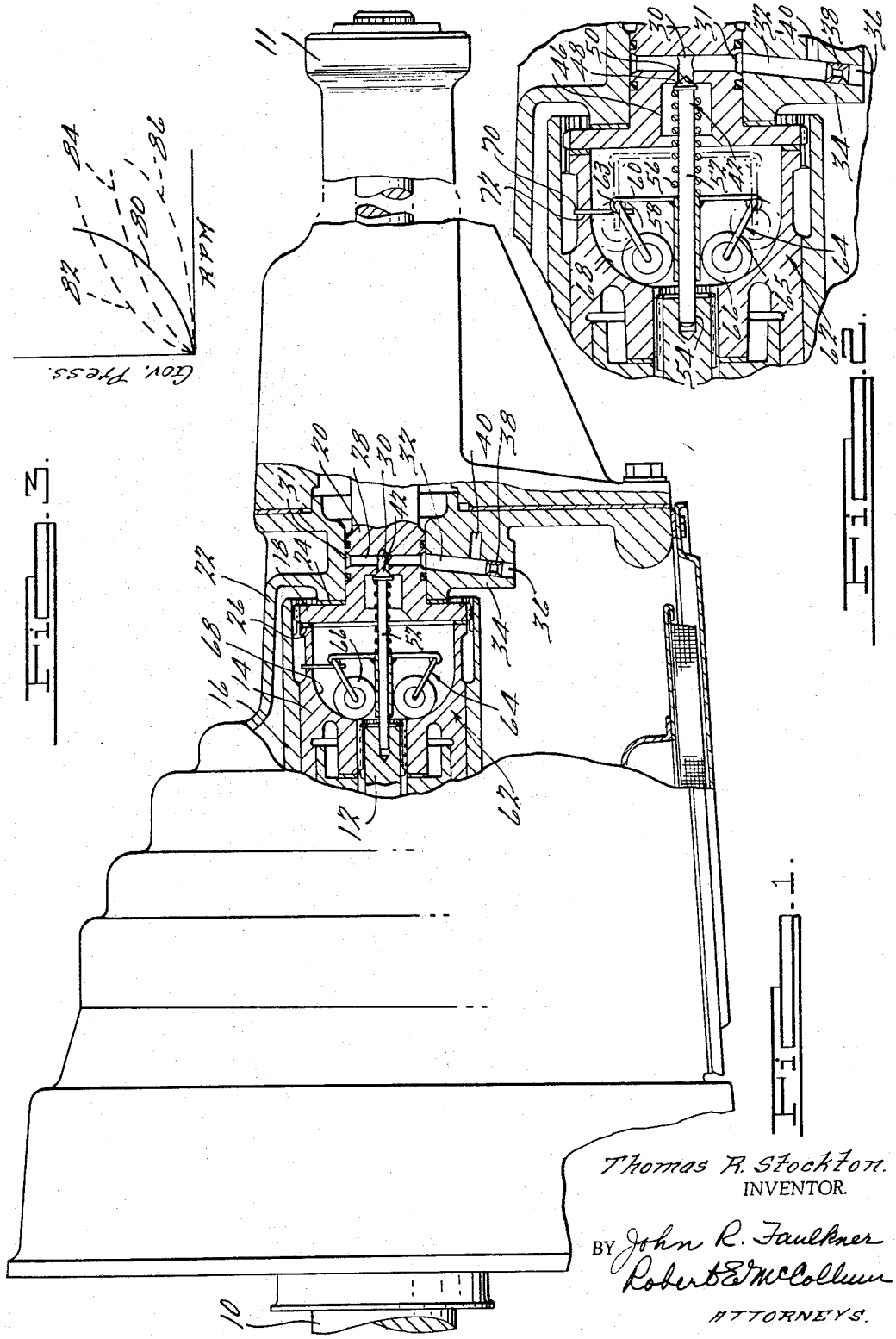
Thomas R. Stockton.
INVENTOR.
BY John R. Faulkner
Robert E. McCollum
ATTORNEYS.

३,२७५,०१०
CENTRIFUGAL MASS TYPE GOVERNOR
Thomas R. Stockton, Northville, Mich., assignor to Ford Motor Company, Dearborn, Mich., a corporation of Delaware
Filed May 23, 1963, Ser. No. 282,702
2 Claims. (Cl. 137—53)

This invention relates to a fluid pressure governor assembly. More particularly, it relates to a governor of the centrifugal type providing a fluid pressure signal that varies as a function of the change in speed of a rotating shaft. It has many uses, one in particular being in connection with the control system for an automatic transmission to regulate the movements of gear ratio determining shift valves in accordance with changes in motor vehicle output or engine speeds.

Fuid pressure centrifugal governors of the single stage type generally produce signal pressures that follow similar parabolic curves of pressure change plotted against the change in speed of rotation of the governor. Substantially the same rate of change of the pressure rise is thereby provided at all times.

A particular feature of a governor constructed according to the invention is that it has controllable characteristics so that its output fluid pressure signal can be made to follow any number of different pressure versus speed curves. A specific rate of change of the pressure rise can therefore be provided, and not one necessarily forced to follow a parabolic curve. This is accomplished by constructing the governor with speed responsive members that do not have a purely radial movement. That is, they are forced to follow a path of a predetermined contour or curvature so that the output fluid pressure signal not only varies as a function of the change in speed of rotation of the governor body, but also as a function of the curvature of the path. By suitably changing the curvature, any desired number of different rates of change in the pressure rise of the governor output fluid can be obtained.

Therefore, it is an object of the invention to provide a centrifugal fluid pressure governor having an output pressure signal rate of change that varies not only with the change in the speed of rotation of the governor body, but also with the path of movement of the governor centrifugally movable elements.

It is another object of the invention to provide a centrifugal fluid pressure governor having controllable characteristics.

It is a further object of the invention to provide a fluid pressure governor having flyweights engaging cam surfaces in their outward radial movements, forcing the flyweights axially in a predetermined manner to vary the fluid pressure output as a compound function of the change of speed of rotation of the governor body and the curvature of the cam surfaces.

It is also an object of the invention to provide a governor fluid pressure signal varying as a function of the change in speed of the governor body. The governor assembly consists of a flow restricting means in the fluid supply line cooperating with a relief valve downstream thereof centrifugally responsive to the speed of rotation of the governor body, and controlled by a contoured cam surface, to vary the flow past the valve.

Other objects, features, and advantages of the invention will become apparent upon reference to the succeeding detailed description thereof, and to the drawings illustrating the preferred embodiment thereof; wherein, FIGURE 1 shows a side-elevational view, with parts broken away and in section, of a transmission in which the embodiment is embodied;

FIGURE 2 is an enlarged view of a portion of FIGURE 1; and,

FIGURE 3 is a chart graphically illustrating the speed versus pressure characteristics of the governor of the invention.

FIGURE 1 shows, in general, a motor vehicle type transmission incorporating a governor constructed according to the invention. The transmission has a power input shaft 10 and a power output shaft 11 connected by suitable gearing and/or other variable speed mechanisms to provide a plurality of forward and reverse drives therethrough. The details of the transmission are not shown since they are believed to be unnecessary for an understanding of the invention.

The transmission input shaft 10 is adapted to be connected to any suitable source of power, not shown, such as the internal combustion engine for a motor vehicle. This shaft, at its rearward end 12, is splined to a stub shaft 14 rotatably mounted within a drum-like sleeve 16. The sleeve, at its rearward end, is splined to a radial flange 18 formed integral with an enlarged portion 20 of the power output shaft 11. The output shaft is rotatably supported within the stationary transmission casing 22. The flange 18, and therefore the output shaft, is axially located by a pair of bearing members 24 and 26 abutting the end of shaft 14 and a portion of the casing 22.

The output shaft 11 has a number of circumferentially spaced radial bores 28 connecting a central bore 30 to a fluid supply annulus 31. The annulus is connected to a main fluid supply passage 32 bored in a stationary portion 34 of the transmission casing. Passage 32 has a fluid inlet 36 connected to a source (not shown) of fluid under a varying pressure.

The source of pressure could be an engine driven or vehicle output shaft driven pump, or any other suitably driven pump, providing a variable output with changes in speed of a rotating shaft. Alternately, it could be a constant pressure pump. In the particular instance illustrated, the governor is shown as being rotated by the engine shaft 12. For the purposes of a typical installation, therefore, the pump in this case is also adapted to be driven from the engine. This would agree with those transmissions where no driven shaft pump is provided.

The fluid flowing through supply passage 32 is initially controlled by an orifice 38 of fixed cross-sectional area. The orifice not only delays a buildup in pressure in line 32 and bore 30, but also isolates the system upstream of the orifice from the action of the governor. Thus, what pressure change occurs downstream of the orifice is not reflected throughout the entire fluid pressure system. The fluid flow through the orifice passes not only into bore 30, but also into a branch line 40. Line 40 reflects the pressure changes in this portion of passage 32 and is used as a governor output pressure signal.

The vent of fluid from bore 30 is controlled by a relief valve 42 slidably movable through an enlarged bore 46 in output shaft portion 20. The valve has a poppet type conical face 48 cooperating with the sharp edge of a shoulder 50 forming the connecting portion between bores 46 and 30. The valve is formed integral with a stem 52 slidably piloted in a guide bore 54 in the portion 12 of the power input shaft. The valve is held in a position to maintain bore 30 closed by means of a spring 56 surrounding the valve stem. The spring is of the controlled rate type and is seated between the valve and a sleeve 58 slidably mounted on stem 52.

Sleeve 58 is welded to a number of spaced radial arms 60 forming a force transmitting portion of the centrifugally responsive governor assembly 62. The arms are each formed with a hinge-like eyelet 63 at their outer peripheries for pivotally mounting the base portion of a yoke-shaped force transmitting lever 64. Each of the levers is substantially U-shaped in cross section, and has two leg portions 65 rotatably supporting a cam follower weight 66.

The weights are of a predetermined mass and frictionally engage a contoured inner surface 68 formed on the inner periphery of stub shaft 14. The stub shaft also nonrotatably supports a number of spaced drive pins 70, the pins projecting through an opening 72 in shaft 14 at one end, and being welded to the eyelet 62 at their opposite ends. Thus, the weights 66 constitute flyweight members, and they, as well as the sleeve 58, are rotated at engine speed by their connections to shaft 14 by pins 70.

The mechanism thus described constitutes a fluid pressure centrifugal governor assembly providing a fluid pressure in line 40 varying as a function of the speed of rotation of the power input shaft and the change in pressure of the supply pump. This will be understood more clearly from a consideration of its operation.

FIGURE 2 shows, in full lines, the position of the governor mechanism when the drive shaft 10 is at rest. The fluid supply pressure is zero, and spring 56 maintains the valve 42 in a position blocking the end of bore 30.

Assuming now that input shaft 10 is rotated, fluid under pressure is introduced into inlet 36, and flows through orifice 38 with an initial delay to fill lines 32, 40, and 28, and bore 30 with fluid. Since input shaft 10 is rotating, arms 60, sleeve 58, and therefore weights 66 are rotated. Centrifugal force acting on the weights urges them radially outwardly along the cam surface 68. The resultant reaction forces from this surface cause an axial movement of the weights to move levers 64, arms 60, and sleeve 58 axially to the dotted line positions in FIGURE 2, for example. This movement compresses spring 56, thereby increasing the forces acting on the valve 42. For any given speed of rotation of input shaft 10, the valve 42 will therefore remain seated until the fluid pressure in line 32 and bore 30 rises sufficiently to unseat the valve and permit escape of fluid. The pressure in lines 30, 32 and 40 will then decrease until it is just below the level necessary to balance the spring force plus axial force induced by the movement of the centrifugally responsive weights 66.

In practice, since the speed of rotation is constantly changing, and therefore the centrifugal forces and fluid pressure, the valve will move back and forth opening and closing, in an attempt to reach an equilibrium position somewhere between wide open and closed positions of the valve, where a balance of fluid pressure versus centrifugal forces is maintained regardless of speed changes.

That is, there is a constant attempt on the part of the fluid pressure to change to balance the rising or decreasing centrifugal forces, as the case may be, resulting in a progressive change in the fluid pressure. Thus, the valve will regulate back and forth to provide a progressive pressure signal in line 40 that is indicative of changes in the speed of rotation of the governor weight members, and one that varies also as a function of the curvature of the surface along which the weights move.

FIGURE 3 illustrates graphically the comparison between the fluid outputs of a known type of governor having a parabolic type curve 80, and the outputs of several governors constructed according to the invention. The output fluid pressure signal provided by the invention is illustrated by the lines 82, 84, and 86. These three latter lines illustrate only three of many that can be provided with the particular construction described. The pressure signal curves 82, 84, and 86 are obtained by choosing different contours or curvatures for the surface 68 against which the cam followers 66 move, and different masses for the weights 66. It can be seen that a large number of different combinations can be obtained by controlling these two variables. It will be clear also, that the output pressure signal could be made to follow the curve 80, if desired.

While the invention has been illustrated in its preferred installation in connection with a motor vehicle type transmission, it will be clear to those skilled in the arts to which the invention pertains, that it would have use in many installations other than that shown, and that many changes and modifications may be made thereto without departing from the scope of the invention.

I claim:

1. A fluid pressure governor assembly comprising, in combination, a rotating governor body, a conduit containing a fluid under a varying pressure, orifice means in an upstream portion of said conduit, a fluid exhaust opening in another portion downstream of said orifice means, and flow restricting valve means variably slidable into and out of said opening to control the rate of flow through said orifice means and the pressure of the fluid in said another portion, means biasing said valve means to close said opening, and substantially radially movable speed responsive flyweight members rotatable by said body and acting on and aiding said biasing means with forces changing as a function of the change in speed of rotation of said body, and a contoured cam surface engaged by said flyweight members in their radial movement for varying the bias on said valve means and the pressure in said another portion as a function of the speed of rotation of said shaft and the curvature of said cam surface.

2. A fluid pressure governor assembly comprising, in combination, a rotating governor body, a fluid conduit containing a fluid under a varying pressure, orifice means in an upstream portion of said conduit, a fluid exhaust opening in another portion downstream of said orifice means, and a flow restricting valve variably slidable axially into and out of said opening in a flow blocking manner to control the rate of flow across said orifice means and the pressure of the fluid in said another portion, a sleeve member slidably mounted on said valve, spring means between said sleeve and valve biasing said valve to close said opening and raise the pressure in said another portion, said body having a contoured cam surface thereon, and substantially radially movable speed responsive flyweight members pivotally secured to said sleeve member and engaging said cam surface to be rotated thereby, the contour of said cam surface effecting an axial sliding movement of said sleeve member against said biasing means with forces changing as a function of the change in speed of rotation of said body to aid said spring means, the pressure in said another portion thereby varying as a function of the speed of rotation of said shaft and the curvature of said cam surface.

References Cited by the Examiner

UNITED STATES PATENTS

| | | | |
|---|---|---|---|
| 2,402,972 | 7/1946 | Mitchell | 137—56 |
| 2,657,699 | 11/1953 | Barrett | 137—53 |
| 2,962,037 | 11/1960 | Simon | 137—53 |

FOREIGN PATENTS

| | | |
|---|---|---|
| 470 | 1883 | Great Britain. |
| 375,315 | 6/1932 | Great Britain. |

WILLIAM F. O'DEA, *Primary Examiner.*

CLARENCE R. GORDON, *Examiner.*